(12) United States Patent
Xiao (10) Patent No.: US 8,890,486 B2
(45) Date of Patent: Nov. 18, 2014

(54) METHOD AND APPARATUS FOR CHARGING A BATTERY

(75) Inventor: Lirong Xiao, Zhuhai (CN)

(73) Assignee: Actions Semiconductor Co., Ltd., Zhuhai (CN)

( * ) Notice: Subject to any disclaimer, the term of this patent is extended or adjusted under 35 U.S.C. 154(b) by 364 days.

(21) Appl. No.: 13/001,390

(22) PCT Filed: Jan. 20, 2010

(86) PCT No.: PCT/CN2010/070288
§ 371 (c)(1),
(2), (4) Date: Dec. 23, 2010

(87) PCT Pub. No.: WO2010/083762
PCT Pub. Date: Jul. 29, 2010

(65) Prior Publication Data
US 2011/0266998 A1 Nov. 3, 2011

(30) Foreign Application Priority Data
Jan. 21, 2009 (CN) .......................... 2009 1 0077300

(51) Int. Cl.
*H02J 7/00* (2006.01)
*H02J 7/04* (2006.01)

(52) U.S. Cl.
CPC ............. *H02J 7/0073* (2013.01); *H02J 7/0093* (2013.01)
USPC ............ 320/160; 320/139; 320/141; 320/145

(58) Field of Classification Search
USPC ..................... 320/155, 139, 141, 145, 160
See application file for complete search history.

(56) References Cited

U.S. PATENT DOCUMENTS

| | | | | |
|---|---|---|---|---|
| 5,670,863 A | * | 9/1997 | Broell et al. ................... | 320/145 |
| 5,777,457 A | * | 7/1998 | Lee .............................. | 320/137 |
| 6,194,874 B1 | * | 2/2001 | Kalogeropoulos et al. ... | 320/160 |
| 6,333,621 B2 | * | 12/2001 | Yamashita .................... | 320/160 |
| 6,456,046 B1 | * | 9/2002 | Gaza ............................. | 320/155 |
| 2008/0203969 A1 | * | 8/2008 | Kurihara et al. .............. | 320/116 |

FOREIGN PATENT DOCUMENTS

| | | |
|---|---|---|
| CN | 201063452 Y | 5/2008 |
| CN | 101246976 A | 8/2008 |
| JP | 10004634 A * | 1/1998 |

OTHER PUBLICATIONS

STIC Center English translation of JP10004634A (Mikitaka Tamai).*

* cited by examiner

*Primary Examiner* — Richard V Muralidar
*Assistant Examiner* — David Henze-Gongola
(74) *Attorney, Agent, or Firm* — Baker & Hostetler LLP (57) ABSTRACT

A method and apparatus for charging a battery is provided. The apparatus includes: a constant current circuit, a constant voltage circuit and a control circuit. The control circuit is adapted to control the constant current circuit to perform constant current charging to the battery; after a battery voltage during the constant current charging reaches a preset charging limited voltage, control the constant voltage circuit to perform constant voltage charging to the battery; after a charging current during the constant voltage charging becomes smaller than or equal to a predetermined threshold, control the battery to be charged by pulse charging until an open circuit voltage of the battery is larger than or equal to a preset voltage threshold.

11 Claims, 6 Drawing Sheets

METHOD AND APPARATUS FOR CHARGING A BATTERY

CROSS-REFERENCE TO RELATED APPLICATIONS

This application is a National Stage of International Patent Application No. PCT/CN2010/070288, filed on Jan. 20, 2010, which claims priority to foreign Patent Application No. CN 200910077300.9, filed on Jan. 21, 2009.

FIELD OF THE INVENTION

The present invention relates to battery charging fields, and more particularly, to a method and an apparatus for charging a battery.

BACKGROUND OF THE INVENTION

Batteries mentioned hereinafter are all chargeable batteries.

Figure 1:
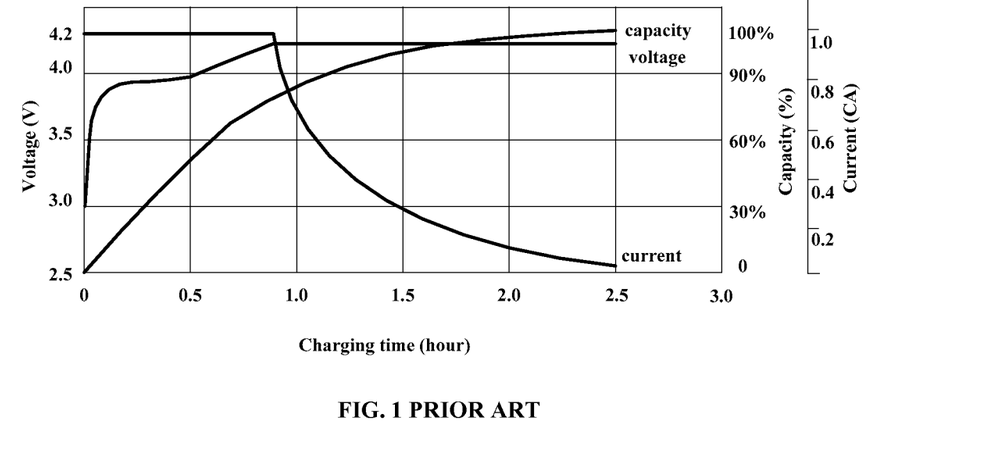
FIG. 1 illustrates curves showing changes of capacity, voltage and current of a battery with time in a first conventional process for charging a battery.

During a first conventional process for charging a battery, curves showing changes of capacity, voltage and current of the battery with time are shown in FIG. 1. First, constant current charging is performed until the voltage of the battery reaches a predetermined value, generally 4.20V. Then, after the voltage of the battery reaches the predetermined value 4.20V, the constant current charging is switched to constant voltage charging in which the predetermined voltage 4.20V is applied, so as to avoid battery performance reducing caused by overcharge of the battery. After the constant voltage charging starts, detection of charging current also starts. When the charging current decreases to 0.001CA (C is the value of the capacity of the battery and A is a measurement unit of current intensity), the charging is terminated. 4.20V is referred to as a charging limited voltage.

The first conventional process has the following disadvantages:

After the constant voltage charging starts, it takes a long time for the charging current to decrease to 0.001 CA from the constant current. Moreover, the closer to 0.001 CA the charging current becomes, the smaller the percentage of the capacity charged into the battery to the whole capacity of the battery becomes. Therefore, the process of the constant voltage charging has a quite low efficiency. In addition, the time when the charging is terminated depends on the capacity of the battery and different batteries may have different capacities. As a result, the current when the charging is terminated is different with respect to different batteries. If a battery whose capacity is unknown is used, the battery may not be fully-charged or it will take a longer time for terminating the charging.

Figure 2:
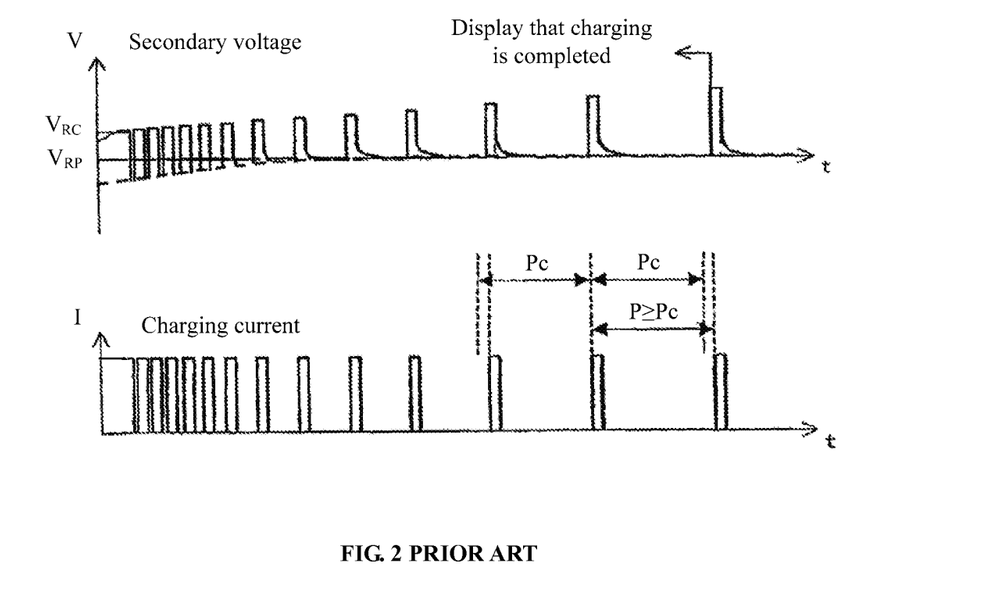
FIG. 2 illustrates curves showing changes of battery voltage and charging current of a battery with time in a second conventional process for charging a battery.

During a second conventional process for charging a battery, curves showing changes of battery voltage and charging current with time are shown in FIG. 2. As shown in FIG. 2, the charging process is described as follows. First, constant current charging is performed until the voltage of the battery reaches a predetermined value $V_{RC}$. Then, after the voltage of the battery reaches the predetermined value $V_{RC}$, pulse current is applied to continue the charging. The value of the pulse current is equal to the value of the constant current. During an off period of the pulse current, the voltage of the battery is detected. If the voltage of the battery decreases to a predetermined voltage $V_{RP}$ ($V_{RC} > V_{RP}$), the pulse current is applied to continue the charging, and a time interval (P) between this pulse current and the previous pulse current is recorded. If the time interval (P) is smaller than predetermined time (Pc), the pulse current is applied to continue the charging. If the time interval (P) is larger than or equal to the predetermined time (Pc), it is determined that the battery has been fully-charged and the charging process is terminated.

The second conventional process has the following disadvantages. If $V_{RC} \geq$ charging limited voltage 4.20V, the voltage of the battery after the pulse current charging starts will be higher than 4.2V. As a result, the battery is overcharged and the performance of the batter is reduced. If $V_{RC} < 4.20V$, the pulse current charging starts too early, and thus the charging time becomes longer.

Figure 3:
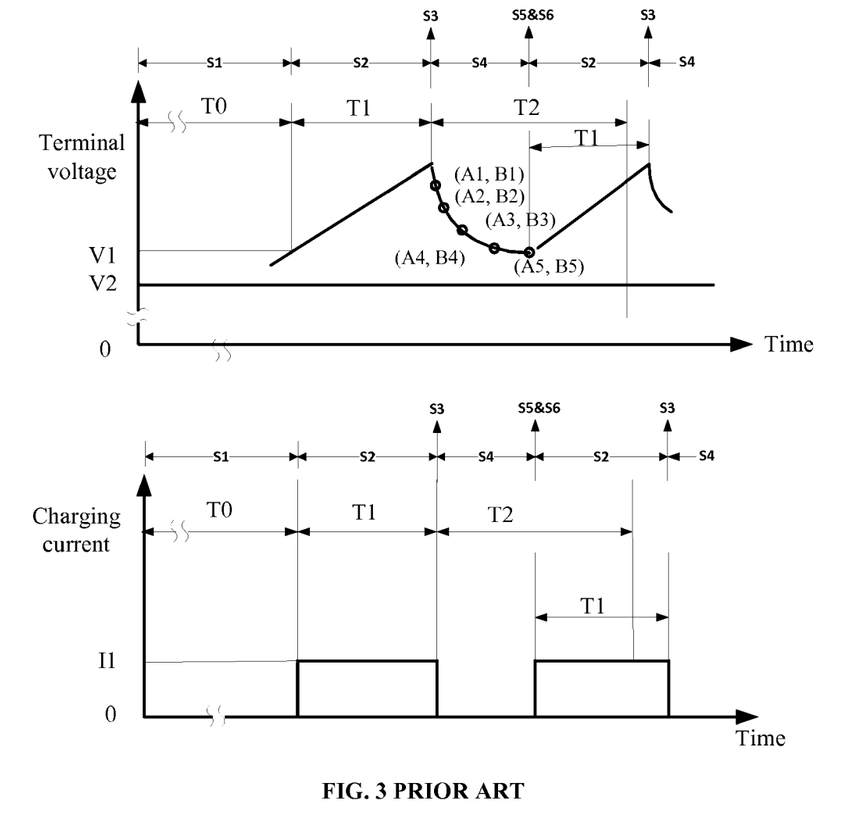
FIG. 3 illustrates curves showing changes of battery voltage and charging current of a battery with time in a third conventional process of charging a battery.

During a third conventional process for charging a battery, curves showing changes of battery voltage and charging current with time are shown in FIG. 3. As shown in FIG. 3, the charging process includes: Step S1: perform constant current charging until the voltage of the battery reaches a predetermined value V1. Because the charging time T0 is long, it is indicated in a clipped manner in FIG. 3. Step S2: after the voltage of the battery reaches the predetermined value V1, switch to apply the pulse current to continue charging the battery. Step S3: stop charging after the battery is charged for a first period of time T1. Step S4: measure passing time An after the charging stops and the voltage of the battery Bn during the passing time An for multiple times, and compare Bn with a second predetermined voltage V2. Step S5: among all values Bn which are higher than V2 when An reaches a second predetermined time T2, deduce, based on data array (An, Bn) of the passing time An and the voltage of the battery Bn, whether the voltage of the battery at a third predetermined time T3 (T3 is larger than T2) will decrease and become smaller than V2 due to stopping charging. Step S6: if it is deduced that the voltage of the battery will decrease to be smaller than or equal to V2, continue the pulse current charging; if it is deduced that the voltage of the battery will not decrease to be smaller than or equal to V2, stop charging. Vertical coordinates in FIG. 3 are just used for describing relative values of V1 and V2, and therefore the values of the voltage are also represented in the clipped manner.

The third conventional process has the following disadvantages. If V1 ≥ charging limited voltage 4.20V, the voltage of the battery after the pulse current charging starts will be higher than 4.2V. As a result, the battery will be overcharged and the performance of the batter will be reduced. If V1 < 4.20V, the pulse current charging will start too early, and thus the charging time becomes longer.

SUMMARY OF THE INVENTION

In view of the above, embodiments of the present invention provide an apparatus for charging a battery, which can effectively avoid overcharge of the battery and can shorten charging time and thus can increase a charging speed.

According to an embodiment of the present invention, an apparatus for charging a battery includes: a constant current circuit, a constant voltage circuit and a control circuit; wherein the control circuit is adapted to
  control the constant current circuit to perform constant current charging to the battery;
  after a battery voltage during the constant current charging reaches a preset charging limited voltage, control the constant voltage circuit to perform constant voltage charging to the battery;
  after a charging current during the constant voltage charging becomes smaller than or equal to a predetermined threshold, control the battery to be charged by pulse charging until an open circuit voltage of the battery is larger than or equal to a preset voltage threshold.

Embodiments of the present invention provide a method for charging a battery, which can effectively avoid overcharge of the battery and can shorten charging time and thus can increase a charging speed.

According to an embodiment of the present invention, a method for charging a battery includes:

step A, performing constant current charging to the battery;

step B, performing constant voltage charging after a battery voltage during the constant current charging reaches a charging limited voltage of the battery;

step C, after a charging current during the constant voltage charging becomes smaller than or equal to a predetermined threshold, performing pulse charging to the battery until an open circuit voltage of the battery is larger than or equal to a preset voltage threshold.

As can be seen from the above technical solution, the pulse charging does not start until the constant voltage charging continues for a period of time, and thus the charging time can be shortened. The technical solution in the present invention need not terminate the charging according to the charging current, but can terminate the charging completely through determining the open circuit battery voltage. Therefore, the technical solution in the present invention is applicable to batteries with different capacities. During the charging process in the present invention, the charging voltage is always smaller than or equal to the charging limited voltage, and thus overcharge of the battery can be avoided.

DETAILED DESCRIPTION OF THE INVENTION

To make the technical scheme and merits of the present invention clearer, the present invention will be described hereinafter in detail with reference to accompanying drawings and embodiments.

Figure 4:
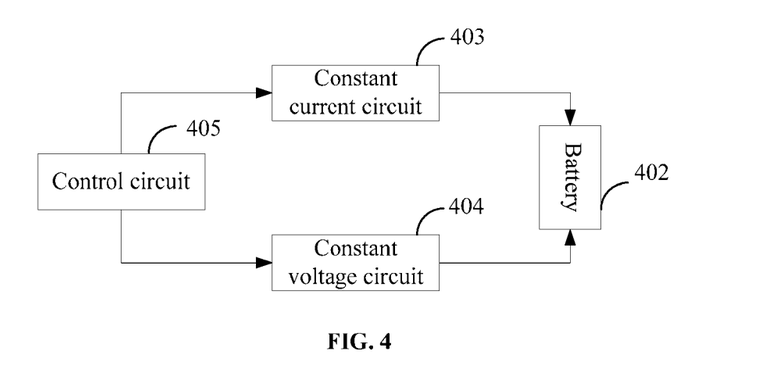
FIG. 4 is a block diagram illustrating a structure of an apparatus for charging a battery according to an embodiment of the present invention.

FIG. 4 is a block diagram illustrating a structure of an apparatus for charging a battery according to an embodiment of the present invention. The apparatus is adapted to charge a battery 402 and includes: a constant current circuit 403, a constant voltage circuit 404 and a control circuit 405. The control circuit 405 is adapted to: control the constant current circuit 403 to perform constant current charging to the battery 402; after the battery voltage during the constant current charging reaches a preset charging limited voltage, control the constant voltage circuit 404 to perform constant voltage charging to the battery 402; and after the charging current during the constant voltage charging becomes smaller than or equal to a predetermined threshold, control the battery 402 to be charged in a pulse charging manner and terminate the charging when an open circuit voltage of the battery 402 is larger than or equal to a preset voltage threshold. Herein, the control circuit 405 may utilize a switch circuit to control the constant current circuit 403 to perform the constant current charging to the battery 402, control the constant voltage circuit 404 to perform the constant voltage charging to the battery 402 and terminate the charging of the battery 402.

Figure 5:
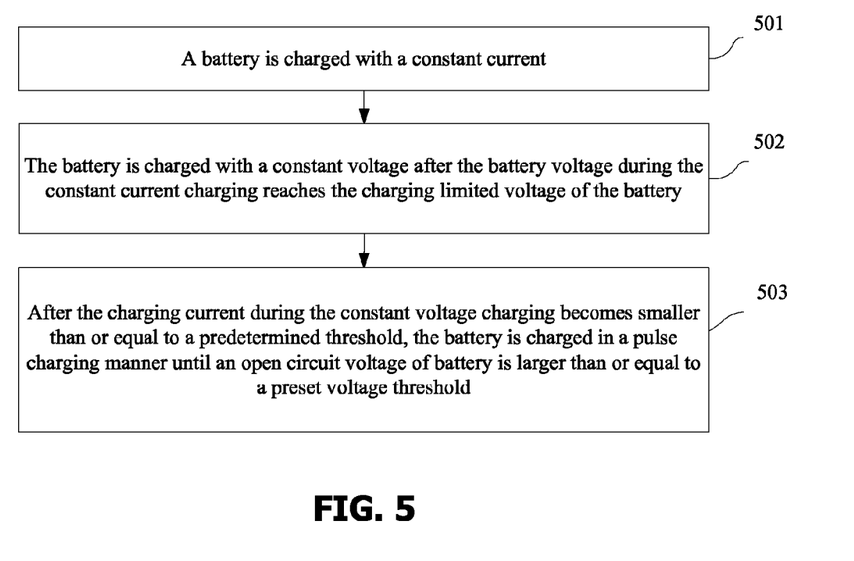
FIG. 5 is a flowchart of a method for charging a battery according to an embodiment of the present invention.

An embodiment of the present invention further provides a method for charging a battery. As shown in FIG. 5, the method includes:

Step 501: A battery is charged with a constant current.

Step 502: The battery is charged with a constant voltage after the battery voltage during the constant current charging reaches a charging limited voltage of the battery.

Step 503: After a charging current during the constant voltage charging becomes smaller than or equal to a predetermined threshold, the battery is charged in a pulse charging manner until an open circuit voltage of the battery is larger than or equal to a preset voltage threshold.

Figure 6:
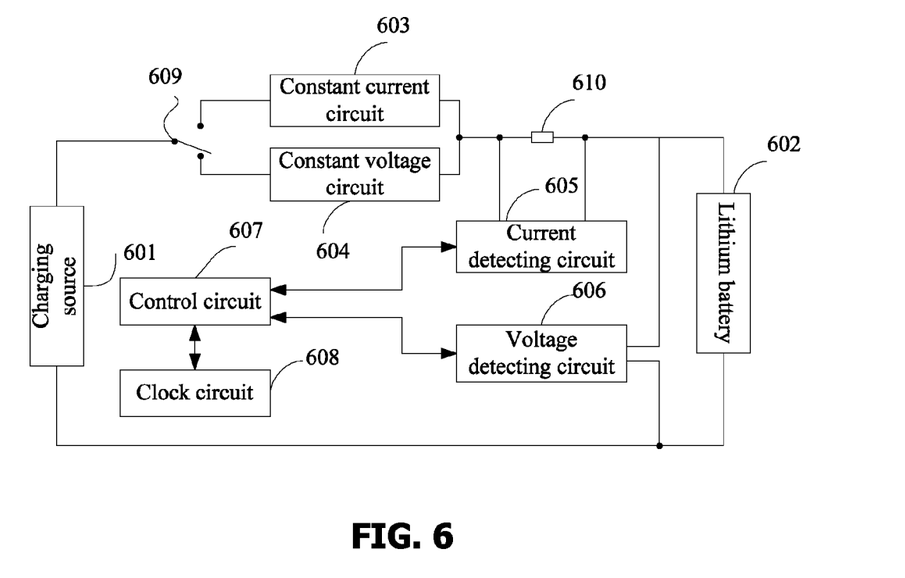
FIG. 6 is a block diagram illustrating function modules of an apparatus for charging a battery according to an embodiment of the present invention.

The technical solution of the present invention will be further described in detail with reference to embodiments. FIG. 6 is a block diagram illustrating function modules of an apparatus for charging a battery according to an embodiment of the present invention. The apparatus is adapted to charge a battery 602, and includes a charging source 601, a constant current circuit 603, a constant voltage circuit 604, a current detecting circuit 605, a voltage detecting circuit 606, a control circuit 607, a clock circuit 608 and a switch circuit 609. The apparatus may further include a slot for placing a battery. The slot includes contacts contacted with positive and negative electrodes of the battery respectively. When the battery 602 is placed in the slot, a circuit illustrated in FIG. 6 is formed. The battery 602 is a lithium battery in this embodiment.

The charging source 601 may be a source with a source adapter or a Universal Serial Bus (USB) interface, and is adapted to provide charging current for the lithium battery 602. It can be understood that the charging source 601 may also be a physical entity outside the apparatus.

The switch circuit 609 is adapted to select a charging circuit. The switch circuit 609 includes three states: connected with the constant current circuit 603, connected with the constant voltage circuit 604, and disconnected. If the switch circuit 609 is in the state of being connected with the constant current circuit 603, the charging source 601, the lithium battery 602, the switch circuit 609 and the constant current circuit 603 form a charging circuit. If the switch circuit 609 is in the state of being connected with the constant voltage circuit 604, the charging source 601, the lithium battery 602, the switch circuit 609 and the constant voltage circuit 604 form a charging circuit. If the switch circuit 609 is in the state of being disconnected, the charging circuit is disconnected.

The constant current circuit 603 is adapted to provide a constant charging current for charging the lithium battery 602.

The constant voltage circuit 604 is adapted to stabilize the voltage of the lithium battery 602 at the charging limited voltage of the lithium battery 602, generally constant 4.2V.

The current detecting circuit 605 is adapted to detect the intensity of the charging current. Preferably, as shown in FIG. 6, a resistance 610 may be further added to the charging circuit. Thus, the current detecting circuit 605 may detect the intensity of the charging current through detecting the intensity of current passing through the resistance 610.

The voltage detecting circuit 606 is adapted to detect the intensity of voltage of the lithium battery 602. If the lithium battery 602 is connected to the charging circuit, what is detected by the voltage detecting circuit 606 is the battery voltage of the lithium battery 602 being charged. If the charging circuit is disconnected, what is detected by the voltage detecting circuit 606 is the open circuit voltage of the lithium battery 602.

The control circuit 607 is adapted to control the switch circuit 609 to select a charging circuit. Specifically, the control includes:

The control circuit 607 enables the switch circuit 609 to be connected with the constant current circuit 603 in an initial charging stage, enables the switch circuit 609 to be connected with the constant voltage circuit 604 when the battery voltage detected by the voltage detecting circuit 606 during the charging reaches the charging limited voltage. Further, when the intensity of the charging current detected by the current detecting circuit 605 becomes smaller than or equal to a predetermined threshold, a first unit in the control circuit 607 makes the switch circuit 609 to be disconnected to stop the charging to the lithium battery 602, and enables the clock circuit 608 to start timing. When a timing period reaches a preset off time $T_{off}$, a second unit in the control circuit 607 enables the clock circuit 608 to clear timing and determines whether the open circuit voltage of the lithium battery 602 detected by the voltage detecting circuit 606 is larger than or equal to a predetermined voltage Vr; if the open circuit voltage is larger than or equal to the predetermined voltage Vr, the control circuit 607 terminates the charging; otherwise, the control circuit 607 controls the switch circuit 609 to perform pulse charging to the lithium battery 602. Specifically, the pulse charging includes: the control circuit 607 enables the switch circuit 609 to be connected with the constant voltage circuit 604 and controls the clock circuit 608 to start timing. When the connected time reaches a preset pulse-charging-on time Ton, the control circuit 607 enables the switch circuit 609 to be disconnected and controls the clock circuit 608 to start timing again. When the disconnected time reaches the preset off time Toff, the control circuit 607 determines whether the open circuit voltage detected by the voltage detecting circuit 606 is larger than or equal to the predetermined voltage Vr; if the open circuit voltage is larger than or equal to the predetermined voltage Vr, the control circuit 607 terminates the charging; otherwise, repeat the pulse charging to the lithium battery 602.

The clock circuit 608 is adapted to provide a timing function.

Figure 7:
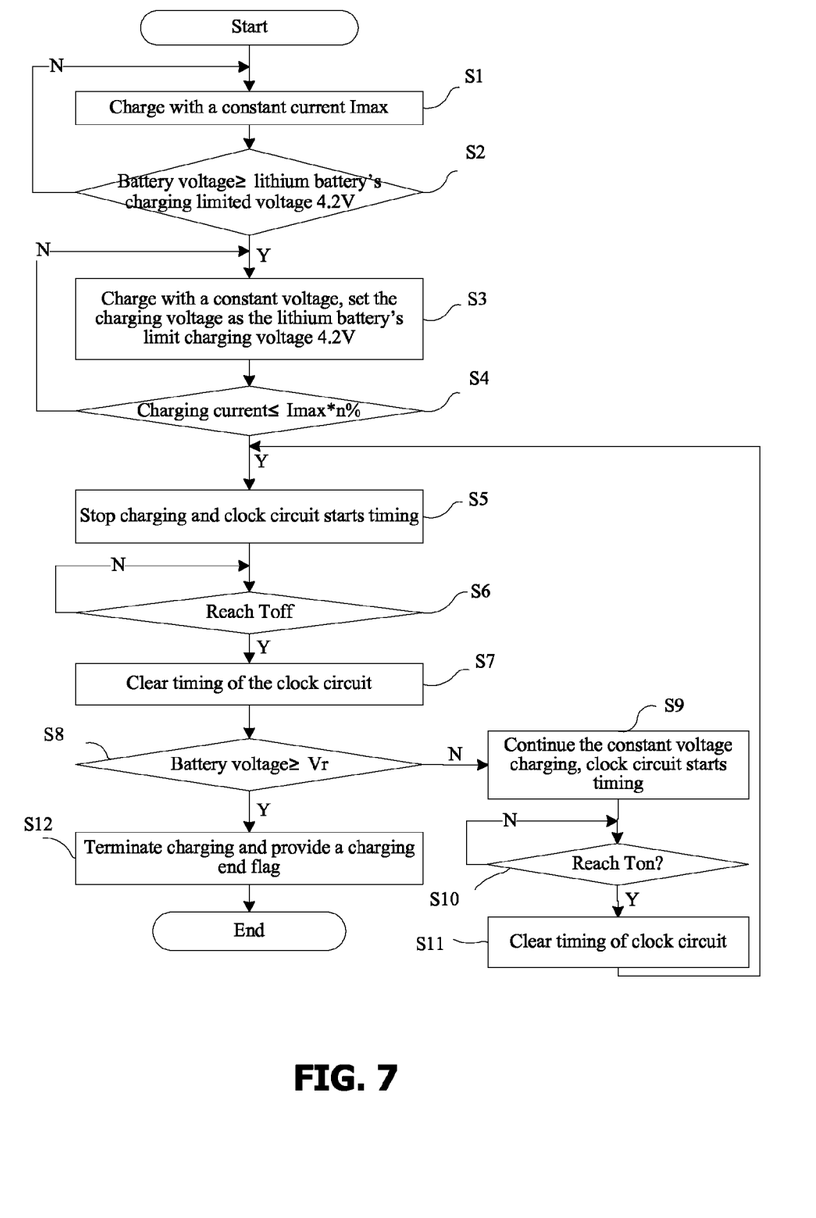
FIG. 7 is a flowchart of a method for charging a battery according to an embodiment of the present invention.

FIG. 7 is a flowchart of a method for charging a battery according to an embodiment of the present invention. The method includes:

Step S1: Control the switch circuit 609 to be connected with the constant current circuit 603. The charging source 601 is connected to the constant current circuit 603 to charge the lithium battery 602 with a constant current Imax.

Step S2: The voltage detecting circuit 606 detects the battery voltage of the lithium battery 602 being charged, and determines whether the battery voltage reaches a charging limited voltage of the lithium battery 602. In this embodiment, the charging limited voltage is 4.2V. If the battery voltage does not reach the charging limited voltage of the lithium battery 602, continue the constant current charging and repeat step S2; otherwise, proceed to step S3.

Step S3: Control the switch circuit 609 to be connected with the constant voltage circuit 604 so as to charge the lithium battery 602 with a constant voltage. In this embodiment, the constant voltage is 4.2V.

Step S4: The current detecting circuit 605 detects the intensity of the charging current, and determines whether the charging current is smaller than or equal to a predetermined threshold. The predetermined threshold may be n % of the constant current Imax. If the current charging current is larger than Imax×n %, continue the constant voltage charging; if the current charging current is smaller than or equal to Imax×n %, proceed to step S5.

Step S5: Disconnect the charging circuit through controlling the switch circuit 609, and meanwhile the clock circuit 608 starts timing.

After the charging circuit is disconnected, the battery voltage will decrease gradually and will become stable after a period of time. The period of time may be pretested through experiments and is referred to as $T_{off}$.

Steps S6-S7: The control circuit 607 determines whether a timing period of the clock circuit 608 reaches the predetermined period of time $T_{off}$, stops and clears timing of the clock circuit 608 if the timing period of the clock circuit 608 reaches $T_{off}$.

Step S8: The voltage detecting circuit 606 detects whether an open circuit voltage of the battery 602 being charged is larger than or equal to a predetermined voltage Vr; if the open circuit voltage is larger than or equal to Vr, it indicates that the battery is fully-charged, and proceed to step S12; if the open circuit voltage is smaller than Vr, proceed to step S9.

Step S9: Continue the constant voltage charging, and meanwhile the clock circuit 608 starts timing.

Step S10: The control circuit 607 determines whether the timing period of the clock circuit 608 reaches a preset pulse-charging-on time $T_{on}$; if the timing period of the clock circuit 608 reaches $T_{on}$, proceed to step S11; otherwise, repeat step S10.

Step S11: Clear timing of the clock circuit 608, and return to step S5.

Step S12: Terminate the charging and provide a charging end flag.

Figure 8:
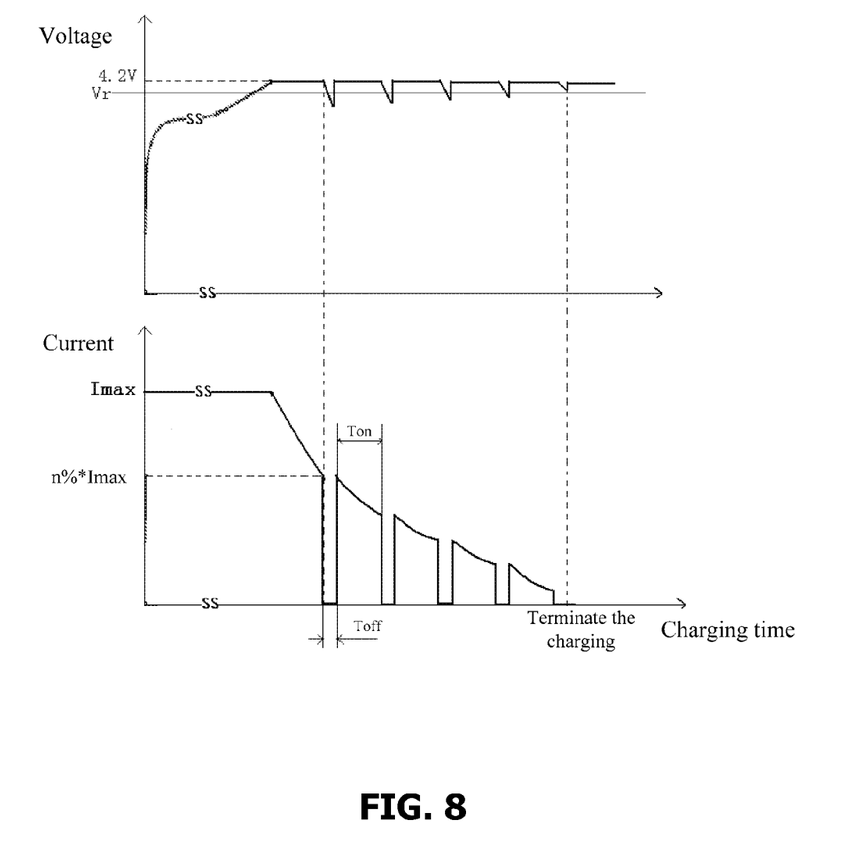
FIG. 8 illustrates characteristic curves of voltage and charging current of a battery during charging according to an embodiment of the present invention.

FIG. 8 illustrates characteristic curves of the voltage and charging current of a battery during charging according to an embodiment of the present invention. In FIG. 8, the constant current charging time is long and is thus represented in a clipped manner. In FIG. 8, the preset time $T_{off}$ is a fixed value and equals to an open circuit stabilizing time of the battery voltage, generally between 1 ms and 10 s but is not limited to this range. In this embodiment, $T_{off}$ is 10 ms. In FIG. 8, the pulse-charging-on time $T_{on}$ is also a fixed value and equals to a periodic pulse charging time. $T_{on}$ has a wider value range, which may be several hundreds of milliseconds or several seconds, or even several minutes. The value range of $T_{on}$ may be represented as 100 ms≤$T_{on}$≤10 min.

Figure 9:
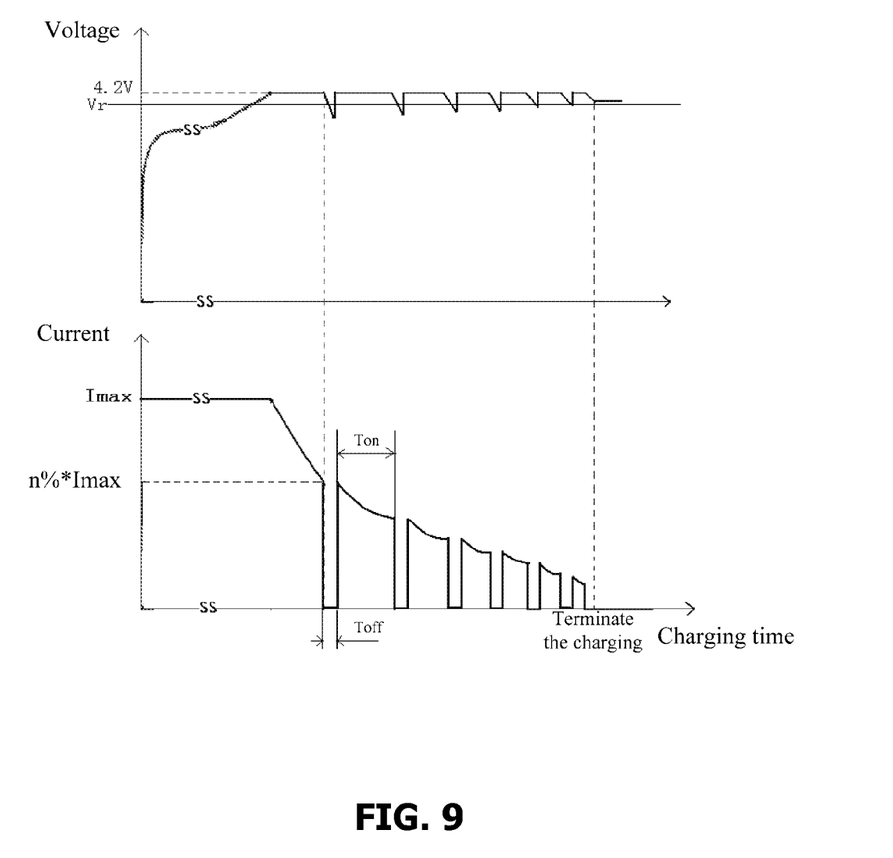
FIG. 9 illustrates characteristic curves of voltage and charging current of a battery during charging according to another embodiment of the present invention.

FIG. 9 illustrates characteristic curves of the voltage and charging current of a battery during charging according to another embodiment of the present invention. In FIG. 9, the constant current charging time is long and is thus represented in a clipped manner. In FIG. 9, the preset time $T_{off}$ is a fixed value and equals to an open circuit stabilizing time of the battery voltage, generally 1 ms to 10 s but is not limited to this range. In this embodiment, $T_{off}$ is 10 ms. In FIG. 9, the pulse-charging-on time $T_{on}$ is decreasing with time. In this embodiment, $T_{on}$ is set to be 10 min at a first time and is set to be 8 min at a second time. When $T_{on}$ decreases to a predetermined minimum value, $T_{on}$ keeps the minimum value and does not change any more. In this embodiment, the minimum value is 1 s.

In view of the forgoing, the technical solution in the present invention need not terminate the charging according to the charging current, but can terminate the charging completely through determining the open circuit battery voltage. Therefore, the technical solution in the present invention is applicable to batteries with different capacities. In the present invention, the pulse charging will not start until the constant voltage charging continues for a predetermined period of time, and thus the charging time can be shortened. During the charging process in the present invention, the charging voltage is always smaller than or equal to the charging limited voltage, and thus overcharge of the battery can be avoided.

The foregoing is only embodiments of the present invention. The protection scope of the present invention, however, is not limited to the above description. Any change or substitution, easily occurring to those skilled in the art, should be covered by the protection scope of the present invention.

The invention claimed is:

1. An apparatus for charging a battery, comprising:
a constant current circuit,
a constant voltage circuit and
a control circuit;
wherein the control circuit is adapted to
control the constant current circuit to perform constant current charging to the battery;
after a battery voltage during the constant current charging reaches a preset charging limited voltage, control the constant voltage circuit to perform constant voltage charging to the battery; and
if a charging current during the constant voltage charging becomes smaller than or equal to a predetermined threshold, start to charge the battery by pulse charging until an open circuit voltage of the battery is larger than or equal to a preset voltage threshold;
a clock circuit;
wherein the control circuit further comprises:
a first unit, adapted to stop the charging to the battery and trigger the clock circuit to start timing; and
a second unit, adapted to, when a timing period reaches a preset off time, clear the timing of the clock circuit and determine whether an open circuit voltage of the battery is larger than or equal to the preset voltage; if the open circuit voltage is larger than or equal to the preset voltage, terminate the charging; otherwise, control the constant voltage circuit to perform the constant voltage charging to the battery and meanwhile trigger the clock circuit to start timing, and when a charging time reaches a predetermined pulse-charging-on time, clear the timing of the clock circuit, and trigger the first unit to stop charging the battery and to trigger the clock circuit to start timing;
wherein a voltage used when the constant voltage circuit performs the constant voltage charging to the battery is the charging limited voltage.

2. The apparatus of claim 1, further comprising
a switch circuit; wherein
an input port of the switch circuit is connected with a source port,
a control port of the switch circuit is connected with the control circuit,
a first output port of the switch circuit is connected with the constant current circuit and
a second output port of the switch circuit is connected with the constant voltage circuit;
the control circuit is adapted to control the input port of the switch circuit to be uniquely connected with the first output port to control the constant current circuit to perform the constant current charging to the battery; control the input port of the switch circuit to be uniquely connected with the second output port to control the constant voltage circuit to perform the constant voltage charging to the battery.

3. The apparatus of claim 2, further comprising a charging source connected with the source port.

4. The apparatus of claim 1, wherein the charging limited voltage is 4.2V.

5. The apparatus of claim 1, wherein the pulse-charging-on time decreases with increase of the number of times that the charging is stopped during the pulse charging.

6. A method for charging a battery, comprising:
A) performing constant current charging to the battery;
B) performing constant voltage charging after a battery voltage during the constant current charging reaches a charging limited voltage of the battery; and
C) if a charging current during the constant voltage charging becomes smaller than or equal to a predetermined threshold, starting to perform pulse charging to the battery until an open circuit voltage of the battery is larger than or equal to a preset voltage threshold;
wherein the performing the pulse charging to the battery until the open circuit voltage of the battery is larger than or equal to the preset voltage threshold comprises:
C1, stopping charging the battery; and
C2, when an off time that the charging is stopped reaches a preset off time, determining whether the open circuit voltage of the battery is larger than or equal to the preset voltage threshold; if the open circuit voltage of the battery is larger than or equal to the preset voltage threshold, terminating the charging; otherwise, performing the constant voltage charging to the battery, and returning to step C1 when a charging time reaches a pulse-charging-on time;
wherein the performing the constant voltage charging to the battery comprises:
performing the constant voltage charging to the battery with the charging limited voltage.

7. The method of claim 6, wherein the preset off time is 1 ms to 10 s.

8. The method of claim 6, wherein the pulse-charging-on time decreases with increase of the number of times that the charging is stopped during the pulse charging.

9. The method of claim 6, wherein the charging limited voltage is 4.2V.

10. The method of claim 9, wherein the pulse-charging-on time is not less than 1 second.

11. The apparatus of claim 1, further comprising a charging source connected with the source port.

* * * * *